Figure 1:
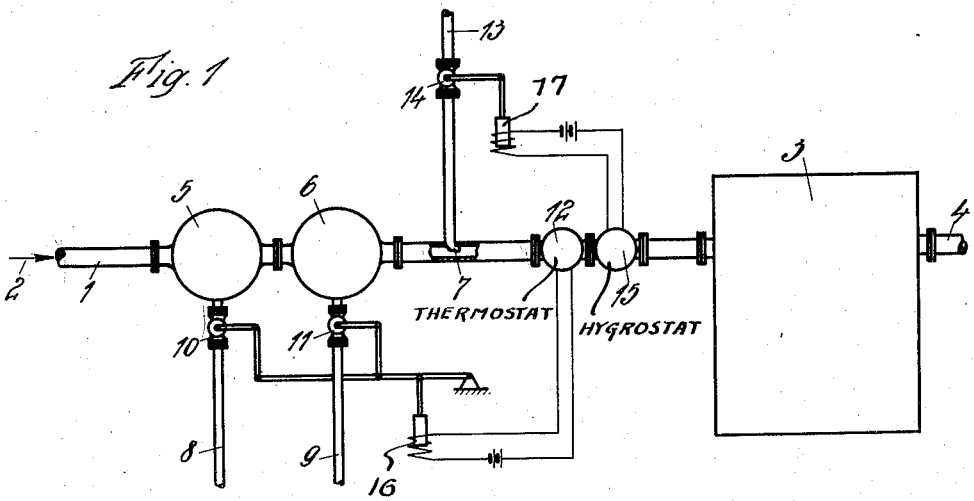

Aug. 25, 1931.  W. FELDMANN  1,820,734
GAS PURIFYING PLANT
Filed Aug. 5, 1929

Inventor
Wilhelm Feldmann
by Knight Bros.
attorneys

Patented Aug. 25, 1931

1,820,734

UNITED STATES PATENT OFFICE

WILHELM FELDMANN, OF BERLIN-CHARLOTTENBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

GAS PURIFYING PLANT

Application filed August 5, 1929, Serial No. 383,742, and in Germany January 9, 1929.

My invention relates to improvements in gas purifying plants, and more particularly to so-called electro-filters for purifying furnace gases.

It has been ascertained that the purification of furnace gases is greatly interfered with owing to the fact that the gases coming from a blast furnace, an ore smelting furnace or the like widely vary regarding their temperature and their contents of moisture. The fluctuations of the temperature and the contents of moisture are in some cases so great that a satisfactory purification of the gases cannot be effected at all. This is particularly the case when electrical precipitators or electro-filters are employed where, if the gases are too dry the non-conducting particles suspended in the gas do not take up an electric charge and thus can be scarcely precipitated, and if the gases have too low a temperature and are too wet a muddy deposit forms on the precipitating surfaces by which they become soiled and corrode.

The object of my invention is to eliminate these drawbacks.

According to my invention a heating and a cooling device, and a device for injecting steam are connected in the gas conduit leading to the purification chamber, which devices are controllable by a thermostat and a hygrostat respectively in such a manner that the gases enter the precipitator always at the same desirable temperature and with the same contents of moisture. The height of the temperature and the degree of moisture of the gases entering the purifier depends substantially upon the condition of the particles of dust suspended in the gases.

An embodiment of my invention is by way of example illustrated in the drawings affixed to my specification.

In these drawings

Figure 2:
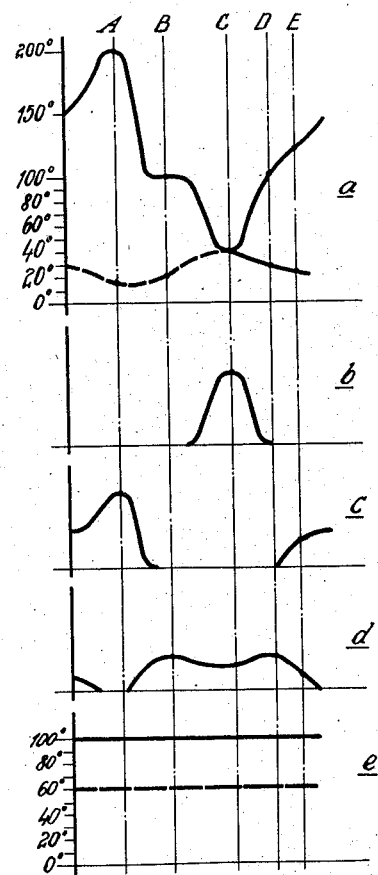

Fig. 1 shows in more or less diagrammatic fashion the construction of an electrical precipitation plant according to my invention, and Fig. 2 shows graphs explaining the mode of operation of my improved apparatus.

Referring to Fig. 1, 1 is the gas supply conduit through which the gases, coming from a blast furnace in the direction of the arrow 2. pass into the precipitating chamber or filter 3 where they are freed from the suspended solid particles. The purified gas is discharged from the precipitating chamber by a pipe 4 and used for operating gas engines or the like. In the gas supply conduit are connected a heating device 5, a cooling device 6 and a device 7 for injecting steam into the gas. The heating device is fed with hot vapors by the pipe 8 and the cooling device with cooling water by the pipe 9. The regulating or control valves 10 and 11 in the two pipes are controlled by the thermostat 12 located in the gas conduit 1 in well known manner through relays or the like, such as solenoids 16, in such a manner that the gases according to whether they arrive excessively cold or hot are heated or cooled. The steam injector 7 is fed by a pipe 13 in which is located a regulating valve 14 which is controlled by a hygrostat 15 located in the gas conduit 1 likewise through relays or the like, such as solenoid 17, in such a manner that the gases are also maintained at a given degree of humidity.

Fig. 2 of the drawings shows by a diagram consisting of five graphs a to e how a plant as illustrated in Fig. 1 operates. Since the graphs are intended to show the course of the occurrences, the abscissa represents the passage of time. In the graph a the full line curve shows the temperature of the gas prior to the entrance into the precipitator. It is assumed that the temperature fluctuates between about 40 and 200°. The curve underneath in broken lines indicates the simultaneous fluctuations of the dew point which may vary between about 10 and 40°. It is now assumed that the gases are to be regulated so that their temperature is about 100° and their dew point about 60°. In the graph b is shown when and how many thermal units are to be applied to the gas.

The graph c shows the time and the quantity of the cooling water employed for the regulation.

When and what volumes of steam must be injected into the gases to impart to them the desired contents of moisture is illustrated in the graph *d*.

The diagram *e* shows the state to which the gas is regulated by the complete apparatus. The points A—E show five particularly characteristic states which the non-regulated gases in the supply conduit have prior to their entry into the precipitator or electric filter.

At the point A the gas temperature is 200°. Since this temperature is far above the desired temperature of 100° it is cooled down and simultaneously the dew point raised 60° by evaporating the injected water.

At the point B the gas temperature is 100° and thus has the desired height and neither cooling nor heating is necessary. Since the dew point of the arriving gas amounts to 20° only a corresponding volume of steam is blown into the gas.

At the point C temperature and moisture values are 40°. The contact thermometer therefore operates the heating device. This by itself does not raise the dew point. In order to bring the dew point from 40° to the desired height of 60° a corresponding volume of air must again be injected which is adjusted by the contact hygrometer.

Beyond the point D the temperature rises above 100° and at this point the heating device is automatically stopped and the cooling device started as shown by the two graphs *b* and *c*.

At the point E the temperature of the gas is 120°, the dew point 25°. According to the excessively high temperature the cooler is rendered operative. Since, however, at the cooling to 120° and 100° the gas does not evaporate a sufficient quantity of the cooling water, the dew point would still be too low. At this point the hygrostat comes into action and causes the injection of a certain volume of steam into the gas.

I claim as my invention:

1. In an apparatus for purifying, particularly electrically, furnace gases, in combination, a precipitation chamber, a gas supply pipe to said chamber, a gas discharge pipe from said chamber, and devices located in said gas supply pipe for varying the temperature and humidity of the gases, and temperature and humidity responsive means for respectively controlling said devices for maintaining said gases at a given temperature and humidity.

2. In an apparatus for purifying, particularly electrically, furnace gases, in combination, a precipitating chamber and a gas supply and a discharge duct connected to said chamber, a heating and a cooling device located in said supply duct and a thermostat in said supply duct for controlling said devices to maintain the gases supplied to said chamber at a given temperature, and a humidifying device in said supply duct and a hygrostat in said duct for controlling said humidifying device to also maintain a given condition of humidity in the gases supplied to said chamber.

3. In an apparatus for electrically purifying gases, in particular blast furnace gases, means for maintaining a constant condition of the gases prior to their entry into the purifying chamber, comprising heating and cooling means and a thermostatic control therefor responsive to the raw gas temperature for maintaining the raw gases at a given temperature, and humidifying means and a hygrostatic control therefor responsive to the raw gas humidity, for also maintaining the raw gases at a given degree of humidity.

In testimony whereof I affix my signature.

WILHELM FELDMANN.